United States Patent
Lewin et al.

(10) Patent No.: US 11,831,542 B2
(45) Date of Patent: Nov. 28, 2023

(54) PLATFORM FOR ROUTING INTERNET PROTOCOL PACKETS USING FLOW-BASED POLICY

(71) Applicant: Microsoft Technology Licensing, LLC, Redmond, WA (US)

(72) Inventors: Guy Lewin, New York, NY (US); Vikrant Arora, UP (IN); Ofir Yakovian, Tel-Aviv (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/720,133

(22) Filed: Apr. 13, 2022

(65) Prior Publication Data
US 2023/0336465 A1   Oct. 19, 2023

(51) Int. Cl.
*H04L 45/00* (2022.01)
*H04L 12/46* (2006.01)
*H04L 45/745* (2022.01)

(52) U.S. Cl.
CPC .......... *H04L 45/38* (2013.01); *H04L 12/4633* (2013.01); *H04L 45/566* (2013.01); *H04L 45/745* (2013.01)

(58) Field of Classification Search
CPC ... H04L 45/38; H04L 12/4633; H04L 45/566; H04L 45/745
See application file for complete search history.

(56) References Cited

U.S. PATENT DOCUMENTS 8,695,090 B2 * 4/2014 Barile ............... G06F 21/552
 726/22
9,047,476 B2 * 6/2015 Chawla ............ G06F 21/6218
(Continued)

FOREIGN PATENT DOCUMENTS

| CN | 111343132 A | 6/2020 |
|---|---|---|
| JP | 2009026022 A | 2/2009 |
| KR | 100976602 B1 | 8/2010 |

OTHER PUBLICATIONS

Vice, et al., "Overview: VPN Split Tunneling for Microsoft 365", Retrieved from: https://docs.microsoft.com/en-us/microsoft-365/enterprise/microsoft-365-vpn-split-tunnel?view=o365-worldwide, Mar. 4, 2022, 12 Pages.

(Continued)

*Primary Examiner* — Oleg Survillo
*Assistant Examiner* — Monishwar Mohan
(74) *Attorney, Agent, or Firm* — WORKMAN NYDEGGER

(57) ABSTRACT

Policy-based routing of internet protocol (IP) packets using flow context. A system intercepts an event associated with creation of a network connection by an operating system (OS). The system identifies a flow context, including a flow tuple, associated with the network connection. Based on the flow context, and based on a flow-based routing policy, the system determines a provider associated with the network connection. The system records, in a state database, an association between the flow tuple and the provider, and instructs the OS to initiate the network connection. After the creation of the network connection, the system intercepts an IP packet associated with the network connection. Based on a header of the IP packet, the system identifies the flow tuple and, based on a result of querying the state database for the flow tuple, and initiates a provider-based action for the IP packet.

20 Claims, 5 Drawing Sheets

(56) References Cited

U.S. PATENT DOCUMENTS

| | | | |
|---|---|---|---|
| 9,384,359 B2* | 7/2016 | Jacobson | H04L 63/0227 |
| 11,082,444 B2* | 8/2021 | MacLeod | H04L 63/0236 |
| 11,134,104 B2* | 9/2021 | Qureshi | H04L 63/0471 |
| 2012/0163180 A1 | 6/2012 | Goel et al. | |
| 2015/0095597 A1 | 4/2015 | Ayanam et al. | |
| 2017/0091482 A1 | 3/2017 | Sarin et al. | |
| 2018/0336334 A1* | 11/2018 | Yadav | G06F 21/445 |
| 2019/0349357 A1 | 11/2019 | Shukla et al. | |
| 2021/0311641 A1 | 10/2021 | Prakashaiah et al. | |
| 2021/0312077 A1* | 10/2021 | Jain | G06F 21/46 |
| 2021/0344602 A1* | 11/2021 | Lewin | H04L 61/2589 |

OTHER PUBLICATIONS

"Border Gateway Protocol", Retrieved from: https://en.wikipedia.org/wiki/Border_Gateway_Protocol, Mar. 24, 2022, 18 Pages.

"Check Point: Route-Based", Retrieved from: https://web.archive.org/web/20220324200852/https://docs.oracle.com/en-us/iaas/Content/Network/Reference/checkpointCPEroutebased.htm, Mar. 24, 2022, 8 Pages.

"Introduction—Valtix Documentation", Retrieved from: https://docs.valtix.com/aws/aws_workshop/introduction/, Retrieved from: Apr. 21, 2022, 2 Pages.

"Meraki SD-WAN", Retrieved from: https://documentation.meraki.com/Architectures_and_Best_Practices/Cisco_Meraki_Best_Practice_Design/Best_Practice_Design_-_MX_Security_and_SD-WAN/Meraki_SD-WAN, Mar. 28, 2022, 34 Pages.

"MX Addressing and VLANs", Retrieved from: https://documentation.meraki.com/MX/Networks_and_Routing/MX_Addressing_and_VLANs, Jun. 17, 2021, 4 Pages.

"Networks and Tunnel Routing", Retrieved from: https://cloud.google.com/network-connectivity/docs/vpn/concepts/choosing-networks-routing, Retrieved on: Apr. 21, 2022, 9 Pages.

"Secure Application Workloads with Palo Alto Networks VM-Series Firewall", Retrieved from: https://docs.oracle.com/en/solutions/secure-app-palo-alto-firewall/index.html#GUID-CB6D7F26-0DEA-4B27-A265-E6169D8992E9, Retrieved on: Apr. 21, 2022, 15 Pages.

"Site-to-Site VPN Overview", Retrieved from: https://web.archive.org/web/20220120084208/https://docs.oracle.com/en-us/iaas/Content/Network/Tasks/overviewIPsec.htm, Jan. 20, 2022, 9 Pages.

"Traffic Management", Retreieved from: https://web.archive.org/web/20220301215855/https://istio.io/latest/docs/concepts/traffic-management/, Mar. 1, 2022, 16 Pages.

"What is a Network Load Balancer?", Retrieved from: https://web.archive.org/web/20201214113601/https://docs.aws.amazon.com/elasticloadbalancing/latest/network/introduction.html, Dec. 14, 2020, 3 Pages.

"What is an Application Load Balancer?", Retrieved from: https://web.archive.org/web/20201213163849/https://docs.aws.amazon.com/elasticloadbalancing/latest/application/introduction.html, Dec. 13, 2020, 4 Pages.

Bender, et al., "Virtual Network Traffic Routing", Retrieved from: https://docs.microsoft.com/en-us/azure/virtual-network/virtual-networks-udr-overview#custom-routes, Apr. 16, 2022, 19 Pages.

Keil, Matt, "Threat and Data-Theft Prevention Policies with VM-Series", Retrieved from: https://cloud.google.com/architecture/partners/threat-and-data-theft-prevention-policies-with-vm-series#protecting_apps_from_inbound_threats_and_outbound_data_theft, Jan. 23, 2019, 9 Pages.

Majumder, et al., "Dynamic Routing", Retrieved from: https://docs.citrix.com/en-us/citrix-sd-wan/current-release/routing/dynamic-routing.html, Jul. 28, 2021, 9 Pages.

Majumder, et al., "Zscaler Integration by using GRE Tunnels and IPsec Tunnels", Retrieved from: https://docs.citrix.com/en-us/citrix-sd-wan/current-release/security/citrix-sd-wan-secure-web-gateway/sd-wan-web-secure-gateway-using-gre-tunnels-and-ipsec-tunnels.html, Jun. 9, 2021, 10 Pages.

Panni, Jess, "AWS vs Azure vs Google Cloud Platform—Networking", Retrieved from: https://endjin.com/blog/2016/11/aws-vs-azure-vs-google-cloud-platform-networking, Nov. 14, 2016, 18 Pages.

Patel, Ashish, "Azure—Difference between Azure ExpressRoute and Azure VPN Gateway", Retrieved from: https://medium.com/awesome-azure/azure-difference-between-azure-expressroute-and-azure-vpn-gateway-comparison-azure-hybrid-connectivity-5f7ce02044f3, Sep. 6, 2021, 6 Pages.

Patel, Ashish, "Azure—Difference between Azure Load Balancer and Application Gateway", Retrieved from: https://medium.com/awesome-azure/azure-difference-between-azure-load-balancer-and-application-gateway-9a6019c23840, Jul. 1, 2020, 5 Pages.

Vaidyanathan, et al., "Network Transformation with AWS and Valtix for Workload Segmentation and Compliance", Retrieved from: https://aws.amazon.com/blogs/apn/network-transformation-with-aws-and-valtix-for-workload-segmentation-and-compliance/, Nov. 22, 2021, 8 Pages.

Vice, et al., "Implementing VPN Split Tunneling for Microsoft 365", Retrieved from: https://docs.microsoft.com/en-us/microsoft-365/enterprise/microsoft-365-vpn-implement-split-tunnel?view=o365-worldwide#common-vpn-scenarios, Mar. 4, 2022, 8 Pages.

U.S. Appl. No. 17/847,117, filed Jun. 22, 2022.

U.S. Appl. No. 17/816,381, filed Jul. 29, 2022.

"Get-SmbConnection", Retrieved from: https://docs.microsoft.com/en-us/powershell/module/smbshare/get-smbconnection?view=windowsserver2022-ps, Retrieved On: Aug. 21, 2022, 3 Pages.

"International Search Report and Written Opinion issued in PCT Application No. PCT/US2023/015150", dated June 16, 2023, 15 Pages.

"International Search Report and Written Opinion Issued in PCT Application No. PCT/US20023/23040", dated Aug. 18, 2023, 14 Pages.

"International Search Report and Written Opinion issued in PCT Application No. PCT/US2023/023309", dated Sep. 15, 2023, 15 Pages.

* cited by examiner

PLATFORM FOR ROUTING INTERNET PROTOCOL PACKETS USING FLOW-BASED POLICY

BACKGROUND

Computer systems have been coupled to one another and to other electronic devices to form both wired and wireless computer networks over which the computer systems and other electronic devices can transfer electronic data. Accordingly, the performance of many computing tasks is distributed across a number of different computer systems and/or a number of different computing environments. Computer networks often transmit data in the form of data packets, which most commonly comprise Internet Protocol (IP) packets—such as Transmission Control Protocol (TCP) packets or User Datagram Protocol (UDP) packets.

Due to various network architecture and network security requirements, many IP-based tunneling solutions have been developed, such as various forms of virtual private network (VPN), which intercept and route IP packets through tunnels to remote systems, based on an IP subnet specified in each IP packet.

BRIEF SUMMARY

In some aspects, the techniques described herein relate to a method, implemented at a computer system that includes a processor, for policy-based routing of IP packets using flow context, the method including: intercepting an event associated with creation of a network connection by an operating system (OS); identifying a flow context associated with the network connection, the flow context including a flow tuple; based on the flow context, and based on a flow-based routing policy: determining a provider at the computer system that is associated with the network connection, recording, in a state database, an association between the flow tuple and the provider, and instructing the OS to initiate the network connection; after the creation of the network connection, intercepting an IP packet associated with the network connection; based on a header of the IP packet, identifying the flow tuple; and based on a result of querying the state database for the flow tuple, initiating a provider-based action for the IP packet.

In some aspects, the techniques described herein relate to a computer system for policy-based routing of IP packets using flow context, including: a processor; and a computer storage media that stores computer-executable instructions that are executable by the processor to cause the computer system to at least: intercept an event associated with creation of a network connection by an OS; identify a flow context associated with the network connection, the flow context including a flow tuple; based on the flow context, and based on a flow-based routing policy: determine a provider at the computer system that is associated with the network connection, record, in a state database, an association between the flow tuple and the provider, and instruct the OS to initiate the network connection; after the creation of the network connection, intercept an IP packet associated with the network connection; based on a header of the IP packet, identify the flow tuple; and based on a result of querying the state database for the flow tuple, initiate a provider-based action for the IP packet.

In some aspects, the techniques described herein relate to a computer program product including a computer storage media that stores computer-executable instructions that are executable by a processor to cause a computer system to implement policy-based routing of IP packets using flow context, the computer-executable instructions including instructions that are executable by the processor to cause the computer system to at least: intercept an event associated with creation of a network connection by an OS; identify a context of the network connection, the context including a flow tuple; based on the context, and based on a flow-based routing policy: determine a provider at the computer system that is associated with the network connection, record, in a state database, an association between the flow tuple and the provider, and instruct the OS to initiate the network connection; after the creation of the network connection, intercept an IP packet associated with the network connection; based on a header of the IP packet, identify the flow tuple; and based on a result of querying the state database for the flow tuple, initiate a provider-based action for the IP packet.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the advantages and features of the systems and methods described herein can be obtained, a more particular description of the embodiments briefly described above will be rendered by reference to specific embodiments thereof which are illustrated in the appended drawings. Understanding that these drawings depict only typical embodiments of the systems and methods described herein, and are not therefore to be considered to be limiting of their scope, certain systems and methods will be described and explained with additional specificity and detail through the use of the accompanying drawings in which.

DETAILED DESCRIPTION

The inventors have recognized that IP-based tunneling providers do not readily coexist at the same computer system, since each tunneling provider takes care of its own packet interception—potentially at different network layers (e.g., layers as defined by the Open Systems Interconnection model). This can lead to conflicts and behaviors that are difficult to predict. Additionally, since existing IP-based tunneling providers route IP packets based on an IP subnet specified in each IP packet, these existing IP-based tunneling providers cannot consider the broader context of the IP packet, such as an associated process, user, domain, category, and the like.

At least some embodiments described herein provide a platform for routing IP packets using flow-based routing policies. The platform described herein is interoperable with a variety of tunneling providers, avoiding the conflicts and unpredictable behavior that conventionally exists when implementing more than one IP-based tunneling solution at the same computer system.

Additionally, the platform described herein routes IP packets on an IP flow basis (e.g., TCP/UDP flow), enabling a different routing different decision to be made per IP flow, and is therefore able to route a flow of IP packets to a specific provider, to route a flow of IP packets through a conventional path through a network stack (i.e., bypass providers altogether), or to block IP packets. In embodiments, the platform described herein links flow context information obtained at the establishment of an IP connection with subsequent IP packet filtering, enabling flow-based routing policies to consider a variety of information associated with an IP flow—such as process, user, domain, category, etc.—in addition to the limited information (e.g., subnet) that can be obtained from IP packets themselves. Thus, the flow-based policies enable rich and expansive routing options that have not been possible previously.

Figure 1:
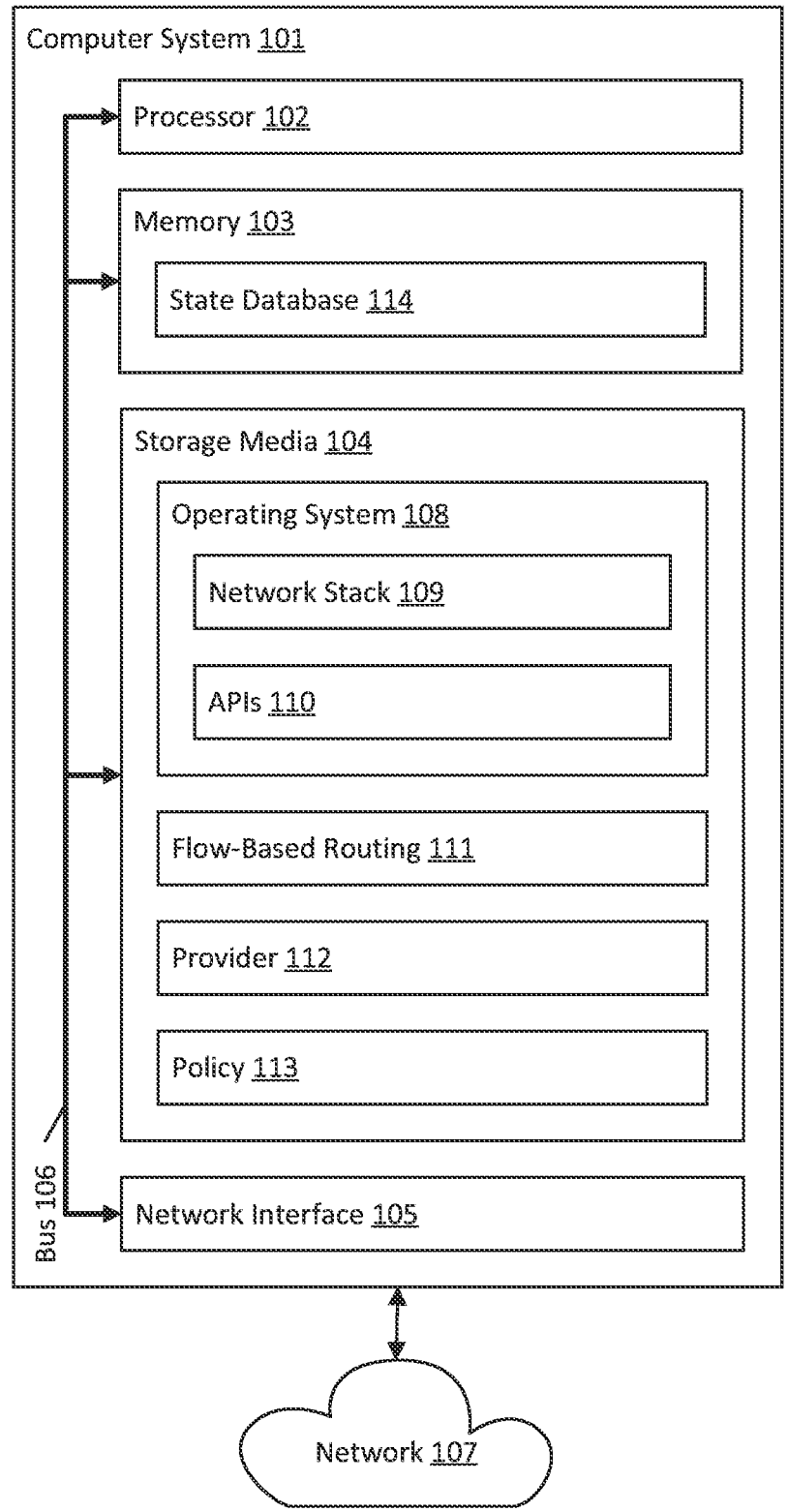
FIG. 1 illustrates an example computer architecture that provides a platform for routing IP packets using a flow-based policy.

FIG. 1 illustrates an example computer architecture 100 that provides a platform for routing IP packets using a flow-based policy. As shown, computer architecture 100 includes a computer system 101 comprising a processor 102 (e.g., a single processor, or a plurality of processors), a memory 103 (e.g., system or main memory), storage media 104 (e.g., a single computer-readable storage medium, or a plurality of computer-readable storage media), and a network interface 105 (e.g., one or more network interface cards, connected to a network 107), all interconnected by a bus 106 (or a plurality of busses).

The storage media 104 is illustrated as storing computer-executable instructions implementing an operating system (OS) (OS 108) which, in turn, includes at least a network stack 109 and a set of application programming interfaces (APIs) (APIs 110). The storage media 104 is also illustrated as storing computer-executable instructions implementing a flow-based routing component 111, which implements a platform for routing IP packets using one or more flow-based routing policies (e.g., policy 113).

In embodiments, the flow-based routing component 111 uses one or more first APIs of APIs 110 (e.g., IP connection filter APIs), together with the policy 113, to control the establishment of IP connections to remote systems via the network stack 109. In embodiments, the policy 113 defines routing rules based on IP tuple associated with the IP connection, such as an IP 4-tuple (e.g., source IP address, source port, destination IP address, and destination port), an IP 5-tuple (e.g., source IP address, source port, destination IP address, destination port, and protocol), and the like. In embodiments, the policy 113 also defines routing rules based on additional IP connection context—such as a process identifier (PID) of a process initiating the IP connection, an owning user of that process, a user of an interactive session associated with that process, a destination domain for the IP connection, a destination domain category, etc. Additionally, in embodiments, based on state (e.g., state database 114) maintained during the establishment of IP connections, the flow-based routing component 111 also uses one or more second APIs of APIs 110 (e.g., packet filtering APIs), to control the routing of IP packets communicated via the network stack 109. In embodiments, the flow-based routing component 111 uses the state database 114 to redirect packets to one or more providers (e.g., provider 112), to pass packets along their conventional path (e.g., from an application to network stack 109, from the network stack 109 to an application), or to drop packets. As used herein, a provider 112 may consume packets, may analyze packets, and/or may output/transmit packets. As examples, a provider 112 can be a tunneling provider (e.g., VPN), a firewall provider (e.g., packet filter), or the like.

In embodiments, by using state maintained during the establishment of IP connections when controlling the routing of IP packets, the flow-based routing component 111 enforces the policy 113 during routing of IP packets, in addition to enforcing the policy 113 during IP connection creation. Thus, the flow-based routing component 111 performs routing not only based on subnet, but also based on rich IP connection context information—such as a PID of a process associated with a flow to which the IP packet belongs, an owning user of that process, a user of an interactive session associated with that process, a destination domain for the IP packet, a destination domain category, etc.

Figure 2:
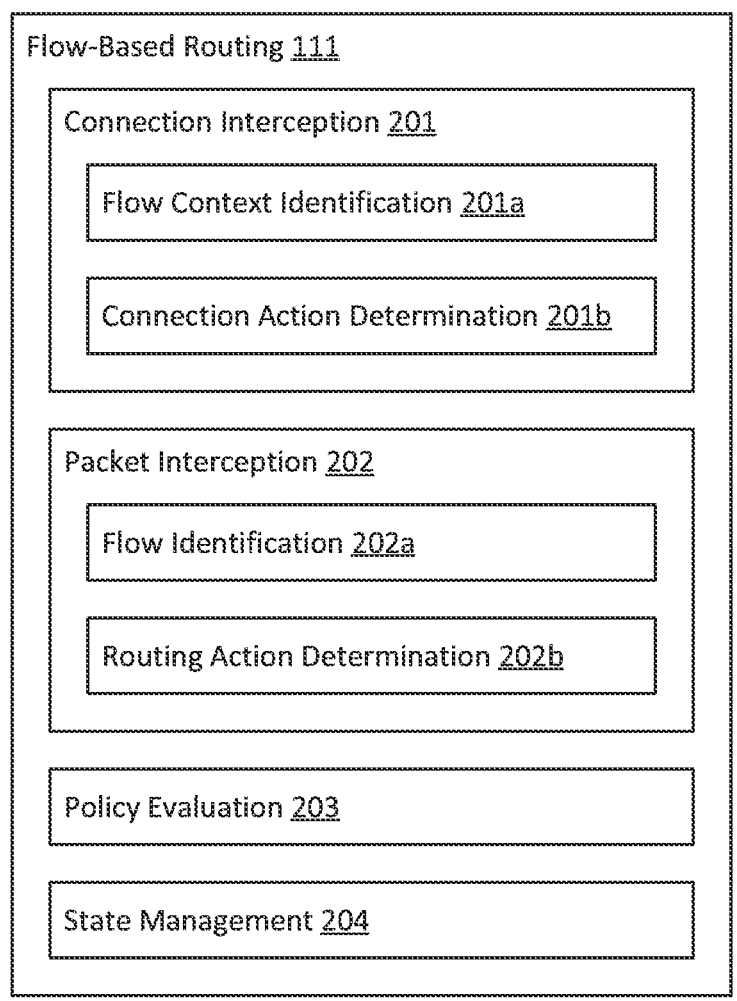
FIG. 2 illustrates an example of internal components of a flow-based routing component.

FIG. 2 illustrates an example 200 of internal components of the flow-based routing component 111 of FIG. 1, according to one or more embodiments. Each internal component of the flow-based routing component 111 depicted in FIG. 2 represents various functionalities that the flow-based routing component 111 might implement in accordance with various embodiments described herein. It will be appreciated, however, that the depicted components—including their identity and arrangement—are presented merely as an aid in describing example embodiments of the flow-based routing component 111. Operation of the internal components of the flow-based routing component 111, as shown in FIG. 2, is now described in connection with FIG. 3, which illustrates an example 300 of flow-based routing.

Figure 3:
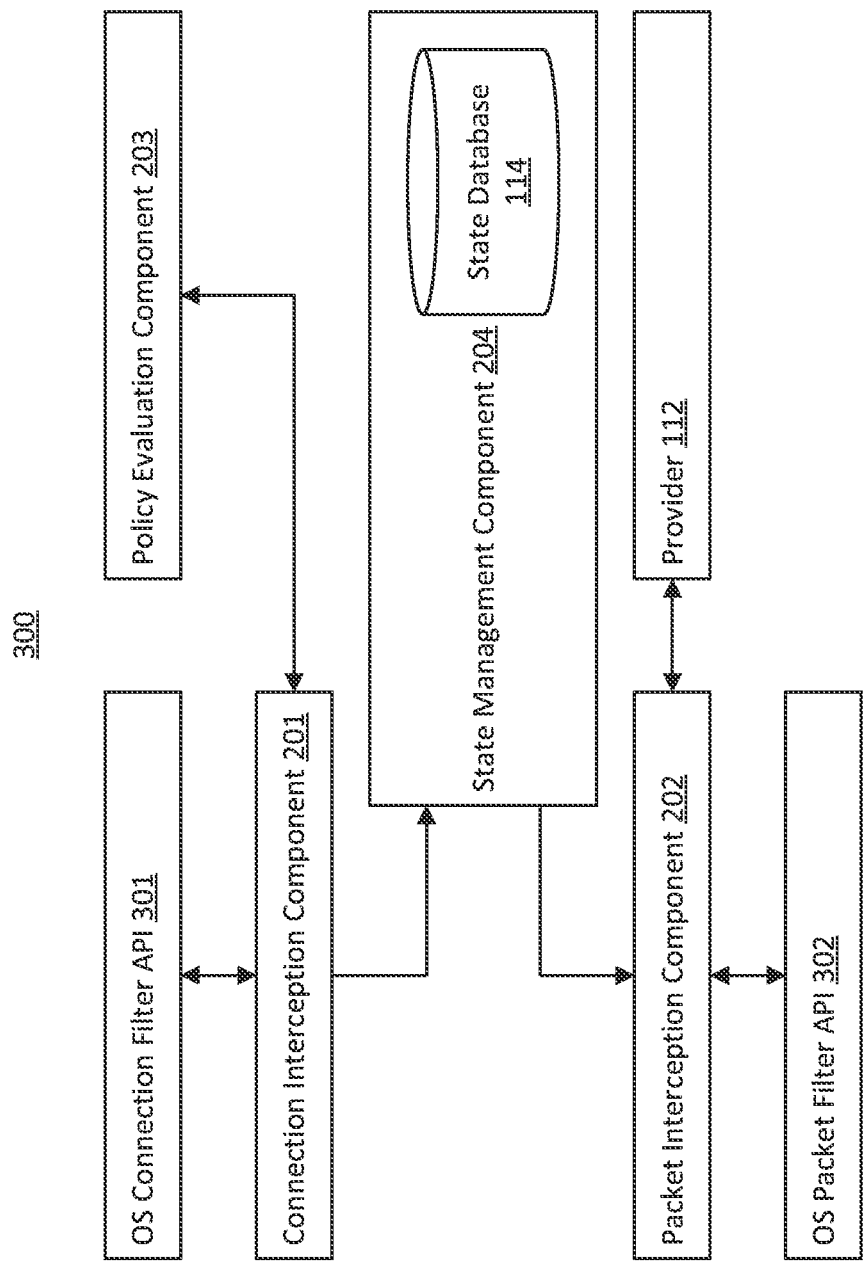
FIG. 3 illustrates an example of flow-based routing.

As shown, in example 200, the flow-based routing component 111 includes a connection interception component 201. In some embodiments, the connection interception component 201 is a kernel-mode component, but other embodiments may implement the connection interception component 201 in user-mode. In embodiments, the connection interception component 201 interfaces with one or more of APIs 110 to intercept events, initiated by processes executing at OS 108, that request the creation of network connections (e.g., IP connections). In FIG. 3, these APIs are illustrated as an OS connection filter API 301, with a double arrow between the OS connection filter API 301 and the connection interception component 201 representing two-way communications between these components. As examples, the OS connection filter API 301 may be a Windows Filtering Platform (WFP) API (WINDOWS), a ContentFilter API (MACOS), or a Netlink API (LINUX). In embodiments, upon interception of an event requesting the creation of a network connection by the connection interception component 201, creation of the requested network connection is suspended until the connection interception component 201 instructs the OS connection filter API 301 to proceed.

As shown, in example 200, the connection interception component 201 includes a flow context identification component 201a and a connection action determination component 201b. In embodiments, the flow context identification component 201a identifies IP flow-based context for an intercepted network connection creation event. In embodiments, this IP flow-based context includes at least a portion of an IP tuple (i.e., one or more of a source IP address, a source port, a destination IP address, a destination port, or a protocol) associated with a requested network connection. In embodiments, this IP flow-based context also includes at least one of a PID of a process initiating the event, an owning user of the process initiating the event, a user of an interactive session associated with the process initiating the event, a destination domain, or a destination domain category (e.g., streaming service, gambling, news, etc.).

In embodiments, based on the identified IP flow-based context, the connection action determination component 201b determines a connection action to be taken for the requested IP connection. In embodiments, available connection actions include a provider action (e.g., tunnel IP packets associated with the IP connection to a selected provider, such as provider 112), a block action (e.g., block creation of the IP connection), and a bypass action (e.g., permit IP packets associated with the IP connection to bypass any consumer, by proceeding though a normal path through network stack 109).

In embodiments, the connection action determination component 201b determines which connection action to take based on an evaluation of policy 113, in light of the identified IP flow-based context. In example 200 and example 300, evaluation of policy 113 is performed by a policy evaluation component 203. In some embodiments, the policy evaluation component 203 is a user-mode component, but other embodiments may implement the policy evaluation component 203 in kernel-mode. In embodiments, the policy 113 comprises one or more rules that each map a desired action (e.g., provider, block, or bypass) to corresponding matching criterion based on IP flow-based context (e.g., IP tuple, process PID, process owner, session owner, domain, domain category). In embodiments, there are plural polices, and the policy evaluation component 203 evaluates these polices in a prioritized manner. In embodiments, when a rule specifies the provider action, the rule also specifies a target provider.

In embodiments, based on the connection action for a particular IP connection that was determined by the connection action determination component 201b, the connection interception component 201 communicates an instruction to the OS connection filter API 301. In embodiments, when the connection action is a provider action or a bypass action, the connection interception component 201 instructs the OS connection filter API 301 to resume creation of the IP connection (i.e., initiate the IP connection). In embodiments, when the connection action is a block action, the connection interception component 201 instructs the OS connection filter API 301 to terminate creation of the IP connection.

In embodiments, and in shown in FIG. 3, in some embodiments the connection interception component 201 updates the state database 114 for one or more intercepted IP connections. In an embodiment, the state database 114 is (at least conceptually) a table comprising key-value pairs, with keys comprising IP tuples (e.g., 4-tuple, 5-tuple) and values being based on a determination by the connection interception component 201. In an embodiment, when the connection action for an IP connection is a provider action, the connection interception component 201 updates the state database 114 with an entry comprising a key of an IP tuple for the IP connection and a value comprising a consumer. In an embodiment, when the connection action for an IP connection is a bypass action, the connection interception component 201 updates the state database 114 with an entry comprising a key of an IP tuple for the IP connection and a value comprising an indication of a bypass. In an embodiment, when the connection action is a block action for an IP connection, the connection interception component 201 updates the state database 114 with an entry comprising a key of an IP tuple for the IP connection and a value comprising an indication of a block. In some embodiments, the connection interception component 201 may omit updating the state database 114 when there the connection action is a bypass action and/or a block action. As discussed infra, the omission of state for bypass and/or block actions can still inherently communicate state that is usable during later IP packet interception.

As shown, in example 200, the flow-based routing component 111 also includes a packet interception component 202. In some embodiments, the packet interception component 202 is a kernel-mode component, but other embodiments may implement the packet interception component 202 in user-mode. In embodiments, the packet interception component 202 interfaces with one or more of APIs 110 to intercept IP packets traveling through the network stack 109. In FIG. 3, these APIs are illustrated as an OS packet filter API 302, with a double arrow between the OS packet filter API 302 and the packet interception component 202 representing two-way communications between these components. As examples, the OS packet filter API 302 may be a Lightweight Filters (LWF) API (WINDOWS), or a tunneling (TUN) interface (MACOS or LINUX).

As shown, in example 200, the packet interception component 202 includes a flow identification component 202a and a routing action determination component 202b. In embodiments, after the packet interception component 202 has intercepted an IP packet, the flow identification component 202a determines an IP flow context for that IP packet. In embodiments, the flow identification component 202a does so by determining an IP tuple (e.g., 4-tuple, 5-tuple) from IP header data of that IP packet. In embodiments, based on the determined IP flow context, the routing action determination component 202b determines a routing action for the IP packet. In embodiments, the routing action determination component 202b determines a routing action of an IP packet based on querying the state database 114 using the determined IP flow context, such as by querying the state database 114 for a key comprising a determined IP tuple.

In some embodiments, based on querying the state database 114, the routing action determination component 202b identifies a provider 112 (e.g., based on a key comprising an IP tuple for the IP packet and a value comprising the provider 112). In these embodiments, the routing action determination component 202b determines a provider-oriented routing action. In some embodiments, the provider 112 is a tunneling provider and the IP packet is an outbound packet (e.g., outbound from a process that initiated the corresponding IP connection); in these embodiments, the provider-oriented routing action comprises routing the IP packet to the provider 112 (e.g., so that the provider 112 can transmit the IP packet through a tunnel). In embodiments, routing the IP packet to the provider 112 may include communicating the IP packet to the provider 112, and instructing the OS packet filter API 302 to drop the IP packet. In some embodiments, the provider 112 is a tunneling provider and the IP packet is an inbound packet (e.g., incoming from network interface 105); in these embodiments, the provider-oriented routing action comprises routing the IP packet to the OS 108. In some embodiments, the provider 112 is a firewall provider. In these embodiments, the routing action determination component 202b determines a routing action (e.g., dropping the IP packet, modifying the IP packet, or passing the IP packet) based on forwarding the IP packet to the provider 112.

In some embodiments, based on querying the state database 114, the routing action determination component 202b determines a bypass routing action. In embodiments, the bypass routing action is determined based on one of identifying a key comprising an IP tuple for the IP packet and a value comprising a bypass indication, or failing to identify a key comprising an IP tuple for the IP packet. In these embodiments, based on determining a bypass routing action, the routing action determination component 202b routes the IP packet to the network stack 109.

In some embodiments, based on querying the state database 114, the routing action determination component 202b determines a block routing action. In embodiments, the block routing action is determined based on one of identifying a key comprising an IP tuple for the IP packet and a value comprising a block indication, or failing to identify a key comprising an IP tuple for the IP packet. In these embodiments, based on determining a bypass routing action, the routing action determination component 202b drops the IP packet. Notably, in embodiments, the routing action determination component 202b may not determine a block routing action since creation of any corresponding IP connection would have been blocked by the connection interception component 201.

In example 200 the flow-based routing component 111 is shown as including a state management component 204, and in example 300 the connection interception component 201 and the packet interception component 202 are shown as interacting with the state management component 204. In example 200 and example 300, the state management component 204 represents functionality for writing to, and reading from, the state database 114. In some embodiments, the state management component 204 is a separate component for managing the state database 114. In other embodiments, however, functionality of the state management component 204 is integrated into the connection interception component 201 and the packet interception component 202 (e.g., such that these components interact with the state database 114 directly).

In some embodiments, the flow-based routing component 111 monitors IP connections established by the network stack 109 and, when detecting that an IP connection has been terminated/destroyed, the flow-based routing component 111 removes a corresponding entry (if any) from the state database 114.

In some embodiments, when carrying out a provider connection action, the connection interception component 201 may prompt a user (e.g., a user of an interactive session associated with the process initiating the event) for cloud-based credentials to initiate an IP connection. In embodiments, based on policy 113, the connection interception component 201 also caches these credentials for establishing subsequent IP connections. This improves user experience by avoiding repeated prompts for the same cloud credentials. In embodiments, IP connections that use the same credentials are grouped into channels, which can be used to manage those IP connections as a group (e.g., to destroy the IP connections together as a group, if needed). In embodiments, separate sets of channels are maintained for different users (e.g., based on interactive session user identifiers).

The components of the flow-based routing component 111 are now described in connection with FIGS. 4A and 4B, which illustrate flow charts of example methods for policy-based routing of internet protocol packets on a flow basis, including a method 400a for establishing an IP connection based on a flow-based policy, and a method 400b for routing an IP packet based on a flow-based policy. In some embodiments, method 400a and method 400b are separate methods. In other embodiments, method 400a and method 400b are different phases of a single method; for example, method 400a is illustrated as proceeding to method 400b, and method 400b is illustrated as following method 400a.

In embodiments, instructions for implementing method 400a and 400b are encoded as computer-executable instructions (e.g., flow-based routing component 111) stored on a computer storage media (e.g., storage media 104) that are executable by a processor (e.g., processor 102) to cause a computer system (e.g., computer system 101) to perform method 400a and 400b.

The following discussion now refers to a number of methods and method acts. Although the method acts may be discussed in certain orders, or may be illustrated in a flow chart as occurring in a particular order, no particular ordering is required unless specifically stated, or required because an act is dependent on another act being completed prior to the act being performed.

Figure 4A:
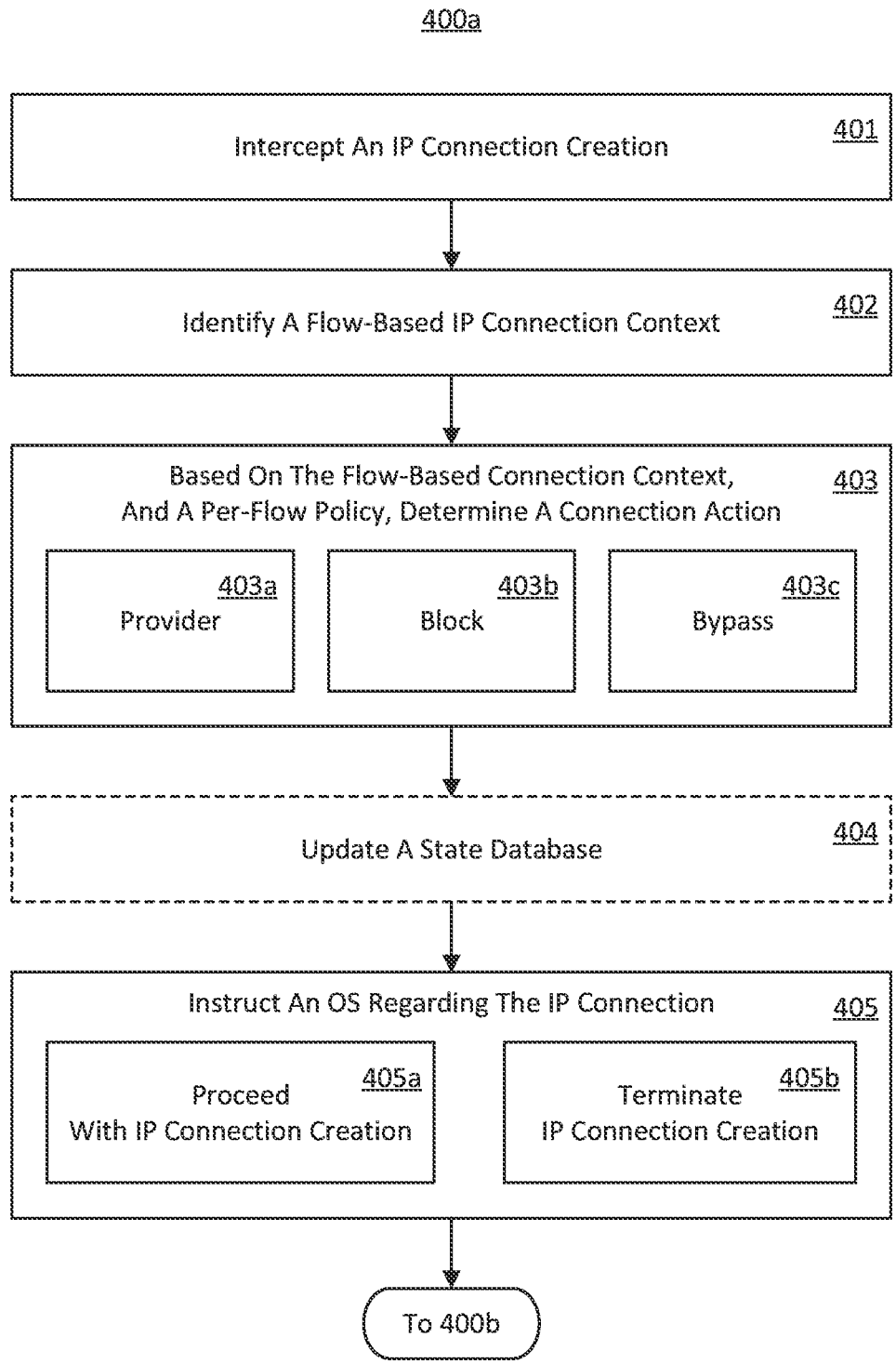
FIG. 4A illustrates a flow chart of an example method for establishing an IP connection based on a flow-based policy as part of a method of policy-based routing of IP packets using flow context.
Figure 4B:
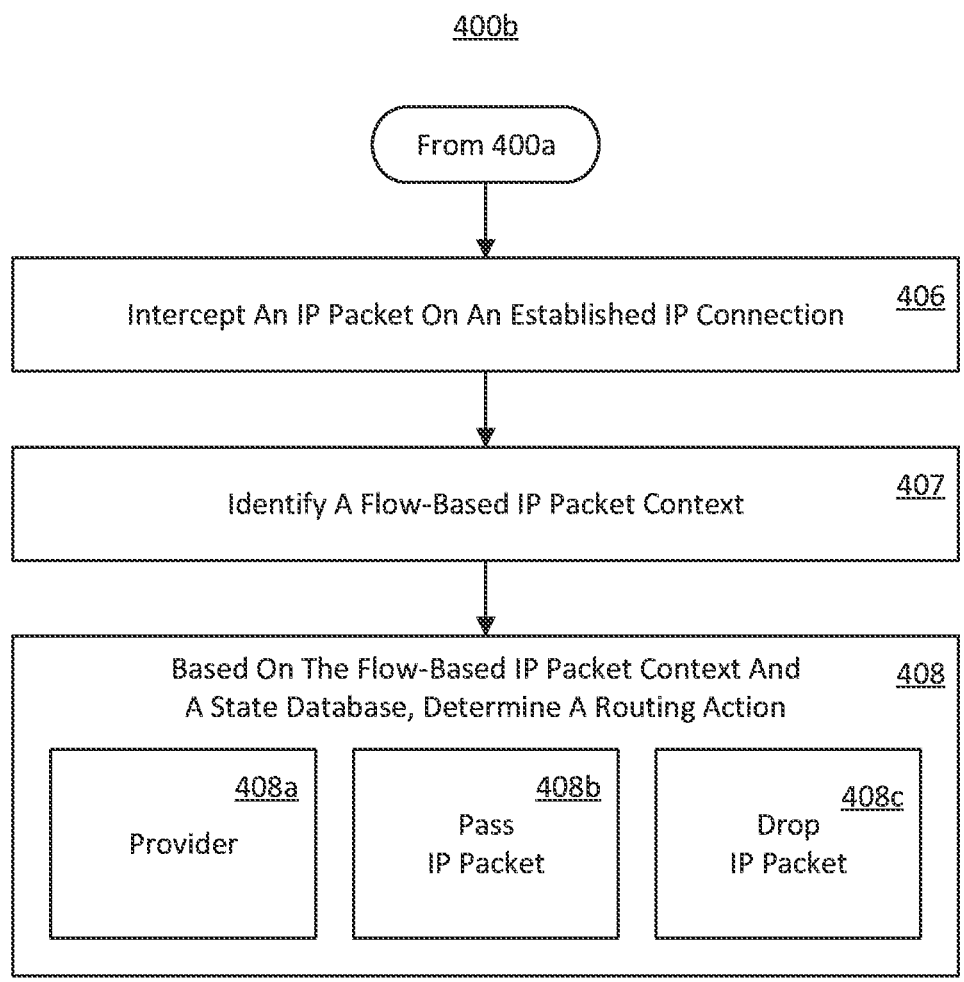
FIG. 4B illustrates a flow chart of an example method for routing an IP packet based on a flow-based policy as part of a method of policy-based routing of IP packets using flow context.

Referring to FIG. 4A, method 400a comprises an act 401 of intercepting an IP connection creation. In an example, based on interfacing with OS connection filter API 301, the connection interception component 201 intercepts an event corresponding to creation of an IP connection. In embodiments, interception of this event pauses/suspends creation of the IP connection by the OS 108.

Method 400a also comprises an act 402 of identifying a flow-based IP connection context. In an example, the flow context identification component 201a identifies context comprising an IP tuple, and in embodiments also identifies context comprising a PID of a process initiating the event, an owning user of the process initiating the event, a user of an interactive session associated with the process initiating the event, a destination domain, a destination domain category, and the like.

Method 400a also comprises an act 403 of, based on the flow-based connection context, and a per-flow policy, determining a connection action. In an example, using the context identified in act 402, the connection action determination component 201b determines a connection action based on consulting policy 113 (e.g., using the policy evaluation component 203). As shown, in embodiments, possible connection actions in act 403 include one or more of a provider action 403a (e.g., when IP packets associated with the IP connection should be routed to a provider 112), a block action 403b (e.g., when the IP connection should be blocked), or a bypass action 403c (e.g., when the IP packets associated with the IP connection should follow normal paths through the network stack 109, bypassing any provider 112).

Method 400a may also comprise an act 404 of updating a state database. In an example, when the determined connection action is the provider action 403a, the connection interception component 201 updates state database 114 to include an entry comprising an IP tuple for the IP connection, plus an indication of an associated provider. In some embodiments, the connection interception component 201 may also update the state database 114 based on a block action 403b and/or a bypass action 403c, but in other embodiments, the connection interception component 201 refrains from updating the state database 114 in one or more of these scenarios.

Method 400a also comprises an act 405 of instructing an OS regarding the IP connection. In an example, based on the connection action determined in act 403, the connection interception component 201 instructs the OS to permit or block the IP connection. As shown, the instructions in act 403 comprise an instruction to proceed with IP connection creation 405a (e.g., for a provider action 403a or a bypass action 403*c*), or an instruction to terminate IP connection creation 405*b* (e.g., for a block action 403*b*).

Technical effects of method 400*a* include granting or denying the creation of an IP connection based on a policy 113 that can include such things as IP tuple, process PID, process owner, session owner, domain, domain category. Technical effects of method 400*a* also include persisting information (e.g., in the state database 114) that can be used to enforce that policy 113 during IP packet filtering. Notably, this information can be persisted explicitly (e.g., by creating an entry in the state database 114 for provider actions), or implicitly (e.g., by omitting an entry in the state database 114 for block and/or bypass actions).

In embodiments, based on creation of an IP connection in connection with method 400*a*, an inbound or outbound IP packet associated with the IP connection is transmitted, triggering performance of method 400*b*. Referring to FIG. 4B method 400*b* comprises an act 406 of intercepting an IP packet on an established IP connection. In an example, based on interfacing with OS packet filter API 302, the packet interception component 202 intercepts an IP packet.

Method 400*b* also comprises an act 407 of identifying a flow-based IP packet context. In an example, based on IP header information extracted from the IP packet, the flow identification component 202*a* identifies IP flow information, such as an IP tuple, associated with the IP packet.

Method 400*b* also comprises an act 408 of, based on the flow-based IP packet context and a state database, determining a routing action. In an example, using the context identified in act 407, the routing action determination component 202*b* determines a routing action based on consulting state database 114 (e.g., using state management component 204). As shown, the connection actions in act 408 can comprise one or more of a provider action 408*a* (e.g., when an IP tuple identified in act 407 is associated with a provider in the state database 114), a pass IP packet action 408*b* (e.g., when an IP tuple identified in act 407 is associated with a bypass indication in the state database 114, or when the IP tuple is not found in the state database 114), or a drop IP packet action 408*c* (e.g., when an IP tuple identified in act 407 is associated with a block indication in the state database 114, or when the IP tuple is not found in the state database 114).

Technical effects of method 400*b* include using implicitly or explicitly-persisted state information (e.g., state database 114) to enforce policy 113 during IP packet filtering.

In some embodiments, the techniques described herein relate to methods, systems, and computer program products for policy-based routing of IP packets using flow context. As a first example, and referring to method 400*a*, in embodiments, the techniques described herein include intercepting an event associated with creation of a network connection by an OS (e.g., act 401). In embodiments, the techniques described herein also include identifying a flow context associated with the network connection, the flow context including a flow tuple (e.g., act 402). In embodiments, the techniques described herein also include, based on the flow context, and based on a flow-based routing policy, determining a provider at the computer system that is associated with the network connection (e.g., act 403, provider action 403*a*); recording, in a state database, an association between the flow tuple and the provider (e.g., act 404); and instructing the OS to initiate the network connection (e.g., act 405, proceed with IP connection creation 405*a*). Technical effects of this first example application of method 400*a* include granting the creation of an IP connection based on a policy that includes an IP tuple and a provider, and persisting information that can be used to route IP packets matching that IP tuple to this provider during IP packet filtering.

Continuing the first example, and referring to method 400*b*, in embodiments, the techniques described herein also include, after the creation of the network connection, intercepting an IP packet associated with the network connection (e.g., act 406). In embodiments, the techniques described herein also include, based on a header of the IP packet, identifying the flow tuple (e.g., act 407). In embodiments, the techniques described herein also include, based on a result of querying the state database for the flow tuple, initiating a provider-based action for the IP packet (e.g., act 408, provider action 408*a*). Technical effects of this application of method 400*b* include using state information that was explicitly persisted in method 400*a* to route IP packets to the identified provider during packet filtering.

Continuing the first example, in some embodiments, the provider is a tunnel component, the IP packet is an outbound packet, and the provider-based action includes routing the IP packet to the provider. Alternatively, in some embodiments, the provider is a tunnel component, the IP packet is an inbound packet, and the provider-based action includes routing the IP packet to the OS. Alternatively, in some embodiments, the provider is a firewall component, and the provider-based action includes dropping the IP packet. Alternatively, in some embodiments, the provider is a firewall component, and the provider-based action includes one or more of modifying the IP packet or passing the IP packet.

Continuing the first example, in some embodiments, the flow context also includes at least one of a PID of a process initiating the event, an owning user of the process initiating the event, a user of an interactive session associated with the process initiating the event, a destination domain, or a destination domain category.

Continuing the first example, in some embodiments, the flow tuple includes one or more of a source IP address, a source port, a destination IP address, a destination port, and a protocol.

Continuing the first example, in some embodiments, the techniques described herein also include determining that the network connection has been destroyed; and removing, from the state database, the association between the flow tuple and the provider.

Continuing the first example, in some embodiments, the techniques described herein also include grouping a plurality of network connections into a channel, based on each of the plurality of network connections being associated with a common network identity.

As a second example, and referring to method 400*a*, in embodiments, the techniques described herein include intercepting an event associated with creation of a network connection by the OS (e.g., act 401). In embodiments, the techniques described herein also include identifying a flow context of the network connection, the flow context including a flow tuple (e.g., act 402). In embodiments, the techniques described herein also include, based on the flow context, and based on the flow-based routing policy: determining a block action for the network connection (e.g., act 403, block action 403*b*), and terminating the creation of the network connection (e.g., act 405, terminate IP connection creation 405*b*). Technical effects of this application of method 400*a* include blocking the creation of an IP connection based on a policy, and persisting information (even if implicitly) that can be used to block packets matching that IP tuple (if any) during IP packet filtering.

In some embodiments, due to blocking of the IP connection in act 405, method 400b is not reached in this second example.

Continuing the second example, in some embodiments, the techniques described herein also include recording, in the state database, an association between the flow tuple and the block action (i.e., an explicit persisting of information that can be used to block IP packets matching that IP tuple during IP packet filtering).

In embodiments, the second example can operate independent of the first example, or in connection with (e.g., before or after) the first example. For instance, in one embodiment of the second example, the event is a second event, the network connection is a second network connection, the flow context is a second flow context, and the flow tuple is a second flow tuple.

As a third example, and referring to method 400a, in embodiments, the techniques described herein include intercepting an event associated with creation of a network connection by the OS (e.g., act 401). In embodiments, the techniques described herein also include identifying a flow context of the network connection, the flow context including a flow tuple (e.g., act 402) based on the second flow context, and based on the flow-based routing policy: determining a bypass action for the second network connection (e.g., act 403, bypass action 403c), and instructing the OS to proceed with the creation of the second network connection (e.g., act 405, proceed IP connection creation 405a). Technical effects of this application of method 400a include permitting the creation of an IP connection based on a policy, and persisting information (even if implicitly) that can be used to bypass providers for packets matching that IP tuple during IP packet filtering.

Continuing the third example, and referring to method 400b, in embodiments, the techniques described herein also include, after the creation of the network connection, intercepting an IP packet associated with the network connection (e.g., act 406). In embodiments, the techniques described herein also include, based on a header of the IP packet, identifying the flow tuple (e.g., act 407). In embodiments, the techniques described herein also include, based on a result of querying the state database for the second flow tuple, routing the second IP packet to a network stack (e.g., act 408, pass IP packet action 408b). Technical effects of this application of method 400b include using state information that was persisted (even if implicitly) in method 400a to pass IP packets during packet filtering.

Continuing the third example, in some embodiments, routing the IP packet to the network stack is based on the result of querying the state database for the flow tuple including a failure to locate the flow tuple in the state database.

Continuing the third example, in some embodiments, the techniques described herein also include recording, in the state database, an association between the second flow tuple and the bypass action (i.e., an explicit persisting of information that can be used to pass IP packets matching that IP tuple during IP packet filtering). In these embodiments, routing the IP packet to the network stack is based on the result of querying the state database for the flow tuple identifying the bypass action for the flow tuple.

In embodiments, the third example can operate independent of the first example, or in connection with (e.g., before or after) the first example. For instance, in one embodiment of the third example, the event is a second event, the network connection is a second network connection, the flow context is a second flow context, the flow tuple is a second flow tuple, and the IP packet is a second IP packet.

Embodiments of the disclosure may comprise or utilize a special-purpose or general-purpose computer system (e.g., computer system 101) that includes computer hardware, such as, for example, one or more processors (e.g., processor 102) and system memory (e.g., memory 103), as discussed in greater detail below. Embodiments within the scope of the present disclosure also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media (e.g., storage media 104). Computer-readable media that carry computer-executable instructions and/or data structures are transmission media. Thus, by way of example, embodiments of the disclosure can comprise at least two distinctly different kinds of computer-readable media: computer storage media and transmission media.

Computer storage media are physical storage media that store computer-executable instructions and/or data structures. Physical storage media include computer hardware, such as random access memory (RAM), read-only memory (ROM), electrically erasable programmable ROM (EEPROM), solid state drives (SSDs), flash memory, phase-change memory (PCM), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., network interface 105), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

It will be appreciated that the disclosed systems and methods may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. Embodiments of the disclosure may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

It will also be appreciated that the embodiments of the disclosure may be practiced in a cloud computing environment. Cloud computing environments may be distributed, although this is not required. When distributed, cloud computing environments may be distributed internally within an organization and/or have components possessed across multiple organizations. In this description and the following claims, "cloud computing" is defined as a model for enabling on-demand network access to a shared pool of configurable computing resources (e.g., networks, servers, storage, applications, and services). A cloud computing model can be composed of various characteristics, such as on-demand self-service, broad network access, resource pooling, rapid elasticity, measured service, and so forth. A cloud computing model may also come in the form of various service models such as, for example, Software as a Service (SaaS), Platform as a Service (PaaS), and Infrastructure as a Service (IaaS). The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

The present disclosure may be embodied in other specific forms without departing from its essential characteristics. The described embodiments are to be considered in all respects only as illustrative and not restrictive. All changes which come within the meaning and range of equivalency of the claims are to be embraced within their scope.

When introducing elements in the appended claims, the articles "a," "an," "the," and "said" are intended to mean there are one or more of the elements. The terms "comprising," "including," and "having" are intended to be inclusive and mean that there may be additional elements other than the listed elements.

What is claimed:

1. A method, implemented at a computer system that includes a processor, for policy-based routing of IP (internet protocol) packets using flow context, the method comprising:
   intercepting an event associated with creation of a network connection by an OS (operating system);
   identifying a flow context associated with the network connection, the flow context including a flow tuple;
   based on the flow context, and based on a flow-based routing policy:
      determining a provider at the computer system that is associated with the network connection,
      recording, in a state database, an association between the flow tuple and the provider, and
      instructing the OS to initiate the network connection;
   after the creation of the network connection, intercepting an IP packet associated with the network connection;
   based on a header of the IP packet, identifying the flow tuple; and
   based on a result of querying the state database for the flow tuple, initiating a provider-based action for the IP packet.

2. The method of claim 1, wherein the provider is a tunnel component, the IP packet is an outbound packet, and the provider-based action comprises routing the IP packet to the provider.

3. The method of claim 1, wherein the provider is a tunnel component, the IP packet is an inbound packet, and the provider-based action comprises routing the IP packet to the OS.

4. The method of claim 1, wherein the provider is a firewall component, and the provider-based action comprises dropping the IP packet.

5. The method of claim 1, wherein the provider is a firewall component, and the provider-based action comprises one or more of modifying the IP packet or passing the IP packet.

6. The method of claim 1, wherein the flow context also includes at least one of a process identifier of a process initiating the event, an owning user of the process initiating the event, a user of an interactive session associated with the process initiating the event, a destination domain, or a destination domain category.

7. The method of claim 1, wherein the flow tuple includes one or more of a source IP address, a source port, a destination IP address, a destination port, or a protocol.

8. The method of claim 1, further comprising:
   determining that the network connection has been destroyed; and
   removing, from the state database, the association between the flow tuple and the provider.

9. The method of claim 1, further comprising:
   intercepting a second event associated with creation of a second network connection by the OS;

identifying a second flow context of the second network connection, the second flow context including a second flow tuple; and
based on the second flow context, and based on the flow-based routing policy:
determining a block action for the second network connection, and
terminating the creation of the second network connection.

10. The method of claim 9, further comprising recording, in the state database, an association between the second flow tuple and the block action.

11. The method of claim 1, further comprising:
intercepting a second event associated with creation of a second network connection by the OS;
identifying a second flow context of the second network connection, the second flow context including a second flow tuple;
based on the second flow context, and based on the flow-based routing policy:
determining a bypass action for the second network connection, and
instructing the OS to proceed with the creation of the second network connection;
after the creation of the second network connection, intercepting a second IP packet associated with the second network connection;
based on a second header of the second IP packet, identifying the second flow tuple; and
based on a result of querying the state database for the second flow tuple, routing the second IP packet to a network stack.

12. The method of claim 11, wherein routing the second IP packet to the network stack is based on the result of querying the state database for the second flow tuple comprising a failure to locate the second flow tuple in the state database.

13. The method of claim 11, further comprising:
recording, in the state database, an association between the second flow tuple and the bypass action,
wherein routing the second IP packet to the network stack is based on the result of querying the state database for the second flow tuple identifying the bypass action for the second flow tuple.

14. The method of claim 1, further comprising grouping a plurality of network connections into a channel, based on each of the plurality of network connections being associated with a common network identity.

15. A computer system for policy-based routing of IP (internet protocol) packets using flow context, comprising:
a processor; and
a computer storage media that stores computer-executable instructions that are executable by the processor to cause the computer system to at least:
intercept an event associated with creation of a network connection by an OS (operating system);
identify a flow context associated with the network connection, the flow context including a flow tuple;
based on the flow context, and based on a flow-based routing policy:
determine a provider at the computer system that is associated with the network connection,
record, in a state database, an association between the flow tuple and the provider, and
instruct the OS to initiate the network connection;
after the creation of the network connection, intercept an IP packet associated with the network connection;
based on a header of the IP packet, identify the flow tuple; and
based on a result of querying the state database for the flow tuple, initiate a provider-based action for the IP packet.

16. The computer system of claim 15, wherein the provider is a tunnel component, the IP packet is an outbound packet, and the provider-based action comprises routing the IP packet to the provider.

17. The computer system of claim 15, wherein the provider is a tunnel component, the IP packet is an inbound packet, and the provider-based action comprises routing the IP packet to the OS.

18. The computer system of claim 15, wherein the provider is a firewall component, and the provider-based action comprises dropping the IP packet.

19. The computer system of claim 15, wherein the provider is a firewall component, and the provider-based action comprises one or more of modifying the IP packet or passing the IP packet.

20. A computer program product comprising a computer storage media that stores computer-executable instructions that are executable by a processor to cause a computer system to implement policy-based routing of IP (internet protocol) packets using flow context, the computer-executable instructions including instructions that are executable by the processor to cause the computer system to at least:
intercept an event associated with creation of a network connection by an OS (operating system);
identify a context of the network connection, the context including a flow tuple;
based on the context, and based on a flow-based routing policy:
determine a provider at the computer system that is associated with the network connection,
record, in a state database, an association between the flow tuple and the provider, and
instruct the OS to initiate the network connection;
after the creation of the network connection, intercept an IP packet associated with the network connection;
based on a header of the IP packet, identify the flow tuple; and
based on a result of querying the state database for the flow tuple, initiate a provider-based action for the IP packet.

* * * * *